(12) United States Patent
Huang et al.

(10) Patent No.: US 11,720,477 B2
(45) Date of Patent: Aug. 8, 2023

(54) UNIT TESTING METHOD BASED ON AUTOMATIC GENERATION OF PATH COVERAGE TEST CASES

(71) Applicant: SOUTH CHINA UNIVERSITY OF TECHNOLOGY, Guangdong (CN)

(72) Inventors: Han Huang, Guangdong (CN); Muming Lian, Guangdong (CN); Fangqing Liu, Guangdong (CN); Zhongming Yang, Guangdong (CN); Zhifeng Hao, Guangdong (CN)

(73) Assignee: SOUTH CHINA UNIVERSITY OF TECHNOLOGY, Guangdong (CN)

( * ) Notice: Subject to any disclaimer, the term of this patent is extended or adjusted under 35 U.S.C. 154(b) by 0 days.

(21) Appl. No.: 17/058,110

(22) PCT Filed: Oct. 31, 2018

(86) PCT No.: PCT/CN2018/113236
§ 371 (c)(1),
(2) Date: Nov. 23, 2020

(87) PCT Pub. No.: WO2019/223247
PCT Pub. Date: Nov. 28, 2019

(65) Prior Publication Data
US 2021/0209008 A1    Jul. 8, 2021

(30) Foreign Application Priority Data

May 23, 2018  (CN) .......................... 201810501975.0

(51) Int. Cl.
*G06F 11/36* (2006.01)

(52) U.S. Cl.
CPC ...... *G06F 11/3684* (2013.01); *G06F 11/3676* (2013.01); *G06F 11/3688* (2013.01); *G06F 11/3692* (2013.01)

(58) Field of Classification Search
CPC ............ G06F 11/3684; G06F 11/3676; G06F 11/3688; G06F 11/3692
See application file for complete search history.

(56) References Cited

U.S. PATENT DOCUMENTS 5,805,795 A * 9/1998 Whitten .............. G06F 11/3672
714/32
5,878,054 A * 3/1999 Sherwood ........... G06F 11/3684
714/739

(Continued)

FOREIGN PATENT DOCUMENTS

CN    102323906    1/2012
CN    102331966    1/2012

(Continued)

OTHER PUBLICATIONS

Tanwer, Sangeeta, and Dharmender Kumar. "Automatic test case generation of C program using CFG." International Journal of Computer Science Issues (IJCSI) 7.4 (2010): 27. (Year: 2010).*

(Continued)

*Primary Examiner* — S. Sough
*Assistant Examiner* — Joanne G Macasiano
(74) *Attorney, Agent, or Firm* — JCIPRNET

(57) ABSTRACT

The present invention provides a unit testing method based on automatic generation of path coverage test cases. First, obtain a control flow graph of a program to be tested is obtained. Then, an executable code is executed in the generated control flow graph based on of an automatically generated test case, and meanwhile, a fitness value is calculated and acquired based on of an execution result of the executable code, and a sub-node is selected to continue repeating the above process, until a terminal node in the control flow graph is found, and finally a path marker is generated and the fitness value corresponding to the path is obtained. Then, an automatic test case generation algorithm (Continued)

is executed, and the algorithm constantly automatically generates test cases based on of the returned fitness value, and exits when the path is completely covered, or a set execution is timed out.

8 Claims, 3 Drawing Sheets

(56) References Cited

U.S. PATENT DOCUMENTS

| | | | | |
|---|---|---|---|---|
| 9,559,928 | B1* | 1/2017 | Porter | H04L 41/5058 |
| 2009/0307664 | A1 | 12/2009 | Huuck et al. | |
| 2015/0339217 | A1* | 11/2015 | Avgerinos | G06F 11/3688 717/132 |
| 2015/0378868 | A1* | 12/2015 | Levit-Gurevich | G06F 11/3644 714/38.1 |
| 2017/0010956 | A1* | 1/2017 | Chen | G06F 11/3688 |
| 2017/0116109 | A1* | 4/2017 | Perez Acosta | G06F 11/3624 |
| 2017/0286079 | A1* | 10/2017 | Cho | G06F 8/40 |
| 2019/0087314 | A1* | 3/2019 | Yang | G06F 11/3676 |

FOREIGN PATENT DOCUMENTS

| | | |
|---|---|---|
| CN | 102419728 | 4/2012 |
| CN | 107590073 | 1/2018 |
| CN | 108710575 | 10/2018 |

OTHER PUBLICATIONS

"International Search Report (Form PCT/ISA/210) of PCT/CN2018/113236", dated Feb. 27, 2019, with English translation thereof, pp. 1-5.

* cited by examiner

```
int triangle(int a, int b, int c)
{
    bool isTriangle;
    if ( ( a < ( b + c )) && ( b < ( a + c) && (c < ( a + b ))
    {
        isTriangle = true;
    }
    else
    {
        isTriangle = false;
    }
    if (isTriangle)
    {
        if ((a == b)&&(a != c) || (a == c)&&(a != b) || (b != c)&&(b != a))
        {
            //Isosceles triangle
        }
        if(a == b && b == c)
        {
            //Equilateral triangle
        }
        if (a != b && a != c && b != c)
        {
            //Ordinary triangle
        }
    }
    else
    {
        //Not triangle
    }
    return 0;
}
```

FIG. 2

UNIT TESTING METHOD BASED ON AUTOMATIC GENERATION OF PATH COVERAGE TEST CASES

CROSS-REFERENCE TO RELATED APPLICATION

This application is a 371 of international application of PCT application serial no. PCT/CN2018/113236, filed on Oct. 31, 2018, which claims the priority benefit of China application no. 201810501975.0, filed on May 23, 2018. The entirety of each of the above mentioned patent applications is hereby incorporated by reference herein and made a part of this specification.

TECHNICAL FIELD

The present invention relates to the software testing field of computer software engineering, and more particularly, to an integrated unit testing method based on automatic generation of path coverage test cases.

BACKGROUND

With the continuous development of the software industry, software testing plays a more and more important role in software development because traditional software testing basically refers to manually generating test cases and then testing software, which is an extremely complicated and tedious physical labor, and is not only high in cost but also easy to make mistakes. Moreover, there are a lot of low-tech and highly repetitive works during software testing, so that a labor cost on testing of enterprises can be effectively reduced by designing intelligent software for automatic software testing. Meanwhile, analyzing a test report can effectively ensure a testing efficiency and a testing effect, and control a testing cost. Excellent automatic testing software can greatly save a lot of manpower and material resources, thus reducing resource consumption, and improving revenues and a market competitiveness of the enterprises.

Most dynamic methods used in the existing automatic software testing methods are based on statement coverage or branch coverage, and path coverage is the strongest coverage in all coverage types of software testing, which has a stronger error correction ability and can more effectively check out defects and errors of the software. Moreover, although there are methods for automatic generation of test cases at present, there are no complete and intelligent methods of automatic software testing which can automatically parse a source code, substitute the test cases for testing, and generate the test report at the same time.

According to a unit testing method based on automatic generation of path coverage test cases used in the present invention, the source code is constructed to analyze and generate a control flow graph module, an automatic test case generation module, a test case execution module and a test report generation module, and these modules are combined to generate an automatic software testing system. Based on automatic generation of path coverage test cases, only the source code needed to be tested needs to be inputted without manual intervention, and then the system may parse the source code to generate a control flow graph, then automatically generate the test cases, constantly perform the testing until all paths in the source code are covered or a maximum number of iterations has been surpassed, and finally generate the test report. Reasonable source code parsing and program analysis technologies are used in the present invention in combination with the method for automatic generation of test cases, thus realizing automatic software testing. Since manual intervention is not needed, the system greatly improves a software testing efficiency, reducing a software testing cost and having an excellent effect.

SUMMARY

Aiming at a deficiency of lacking an integrated automatic software testing method in a current software industry, the present invention develops intelligent unit testing software based on automatic generation of path coverage test cases. The present invention is intended to construct an automatic software testing system, which helps a software tester to remove a lot of low-tech and repetitive works, and is able to quickly obtain a report of test cases covering all paths of a tested program, thus using these test cases to better detect a BUG that may exist in the tested program, repair the program bug, and improve a software quality.

A unit testing method based on automatic generation of path coverage test cases comprises the following steps:

(a) performing file pre-processing on an input source program, which is a source code, to make the source code conform to syntactic structures required by lexical analysis and syntactic analysis;

(b) performing the lexical analysis on the input source code pre-processed in step (a), and establishing a symbol table;

(c) performing the syntactic analysis on the input source code pre-processed in step (a), establishing a control flow graph (CFG) corresponding to the source code, which comprises a control node, an ordinary node and a terminal node, converting the source code into an executable intermediate code, and inserting an executable code into the control node;

(d) generating test cases by an automatic test case generation algorithm;

(e) acquiring the test cases and driving the executable code of the node in the control flow graph to execute, by a test case execution module, and calculating a fitness value of a fitness function on a basis of an execution result of the executable code;

(f) if a current node is not the terminal node, selecting next sub-node (the sub-node refers to next node pointed by the current node) according to the execution result of the executable code, and repeating steps (c), (d) and (e); otherwise, proceeding to next step;

(g) if the current node is the terminal node, acquiring a final result of the fitness value, and generating a path code corresponding to the test case;

(h) determining whether path coverage is 100% or whether an execution is timed out, proceeding to next step if the path coverage is 100%, and exiting if the execution is timed out;

otherwise, repeating steps (d), (e), (f) and (g); and (i) generating a test report containing all paths covered by the test cases correspondingly and the path coverage rate.

Further, in step (a), in case of multiple files in file pre-processing, the files are identified by an include statement in C/C++, and files needing include are placed in a same source file; a block end identifier (which is generally '{' and '}') is inserted into elseif and else in an if-elseif-else structure, the if-elseif-else structure is converted into an if-else nested structure, and a case multi-branch structure in a switch statement structure is converted into an if-else multi-nested structure, thus reducing a code abstraction degree and a realization difficulty of the control flow graph.

Further, in steps (b) and (c), the lexical analysis and the syntactic analysis are performed on the source code to generate the control flow graph (CFG) corresponding to the source code, a structure of any executable code is able to be represented by loop, branch and sequence structures, so that a sequential execution code is converted into a sequence node in the control flow graph, which contains an intermediate representation code of a sequential structure code in the source code, wherein relevant code information is stored by a stack, and the branch structure and the loop structure are instantiated in the graph by constructing a branch node and a local loop of the graph.

Further, in step (c), a function call and a recursive function exist in the source code, the function is regarded as a module, the function is analyzed to construct a control flow graph corresponding to the function; when calling the function, a pointer of a first node of the control flow graph corresponding to the function is transmitted to a call function, and the control flow graph is constructed by combination; and a simple recursive function is constructed into a sub-graph of the control flow graph having a local loop, and the sub-graph is transmitted to an external caller to construct an overall control flow graph during recursive call.

Further, in step (c), a set of intermediate codes based on a stack computer is designed, an operator, such as +, −, *, / and the like, is converted into a corresponding operation instruction, such as ADD, SUB, MUL, DIV and the like, operation instructions of PUSH, POP, MOV and the like and identification instructions of ID, NUM, STR and the like are added, which are used for converting a high-level programming language to generate the intermediate code, and execution of the program is simulated by executing the intermediate code.

Further, in steps (b) and (c), an intermediate code representation method of the source code is stored in the ordinary node and the control node, the execution of the program is able to be abstracted into modification of a variable value in a memory, a variable is represented as an ID symbol and pushed in the method; meanwhile, an address of the variable in the symbol table is pushed, current processing being the variable is known through an ID identifier in a later intermediate code execution stage, then a position of the variable is able to be accessed through an address behind ID, and the variable is operated; if the variable is a number, a NUM symbol is pushed; meanwhile, a value of the number is pushed, the operator is directly pushed, reduction of an abstraction degree of the high-level programming language is represented by the intermediate code, and then an intermediate code interpreter is established, thus directly executing the designed intermediate code; and a basic principle of the constructed intermediate code interpreter is to use a mechanism of a stack computer to execute the intermediate code through one stack and multiple registers, and an execution result of the intermediate code is returned; and after converting the code into the intermediate code, an abstraction degree of the code is reduced, during actual execution of the intermediate code, a method of converting an infix expression into a suffix expression is used to calculate a result of the intermediate code through a data structure of the stack.

Further, in steps (b) and (c), during the syntactic analysis, the syntactic analysis is performed on the source code by recursive descent analysis thus assisting construction of the control flow graph, and the control flow graph which is generated by parsing the source program is systematically constructed according to requirements of the automatic test case generation algorithm through steps (b) and (c), thus automatically generating the control flow graph.

Further, in steps (d) and (e), the generated control flow graph is drivable, which means that the control flow graph is able to automatically execute the executable code in the node according to the generated test case, and then automatically select next node according to an execution result of the code, thus automatically generating a path in the control flow graph.

Further, in steps (d) and (e), during execution of the intermediate code in the node in the control flow graph and during access of an intermediate code interpreter to the symbol table, when a current symbol is accessed, a record of the current symbol is exchanged with a record of a previous symbol in the symbol table, thus increasing a hit probability of a symbol in the symbol table and reducing a time spent in symbol hitting.

Further, in steps (d), (e), (f) and (g), the test cases are constantly and automatically generated through the automatic test case generation algorithm to drive generation of a path in the control flow graph, and if the path coverage rate does not reach 100% or the execution is not timed out, the automatic test case generation algorithm is improved according to an execution result of a previous test case to continue generating the test cases and continue generating the paths.

In the above step (h), the program exits normally and the test report is printed, the system completely realizes automatic software testing based on path coverage, and a software code may be automatically tested through the system.

Compared with the prior art, the present invention has the following advantages and technical effects.

The test cases are automatically generated according to the unit testing method based on the automatic generation of the path coverage test cases, and a tester does not need to spend a lot of energy and do a lot of repetitive works to design the test cases any more. According to an input source code to be tested, the software may automatically perform analysis and generate the test report, thus greatly improving a testing efficiency.

A tester only needs to input the source code to be tested into the intelligent unit testing software based on automatic generation of path coverage test cases, and then the tester may obtain the test report of the test cases and the paths corresponding to the test cases, thus being very simple and convenient. The tester may complete the testing quickly and conveniently without knowing an internal principle, thus having a strong usability and a wide application space.

BRIEF DESCRIPTION OF THE DRAWINGS

FIG. 2 is a code part of a testing program "Triangle" according to the embodiment.

DETAILED DESCRIPTION

The implementation modes of the present invention are further described with reference to the embodiments, but the implementation of the present invention is not limited to the embodiments. It should be noted that anything that is not specifically described in detail hereinafter can be realized or understood by those skilled in the art with reference to the prior art.

Figure 1:
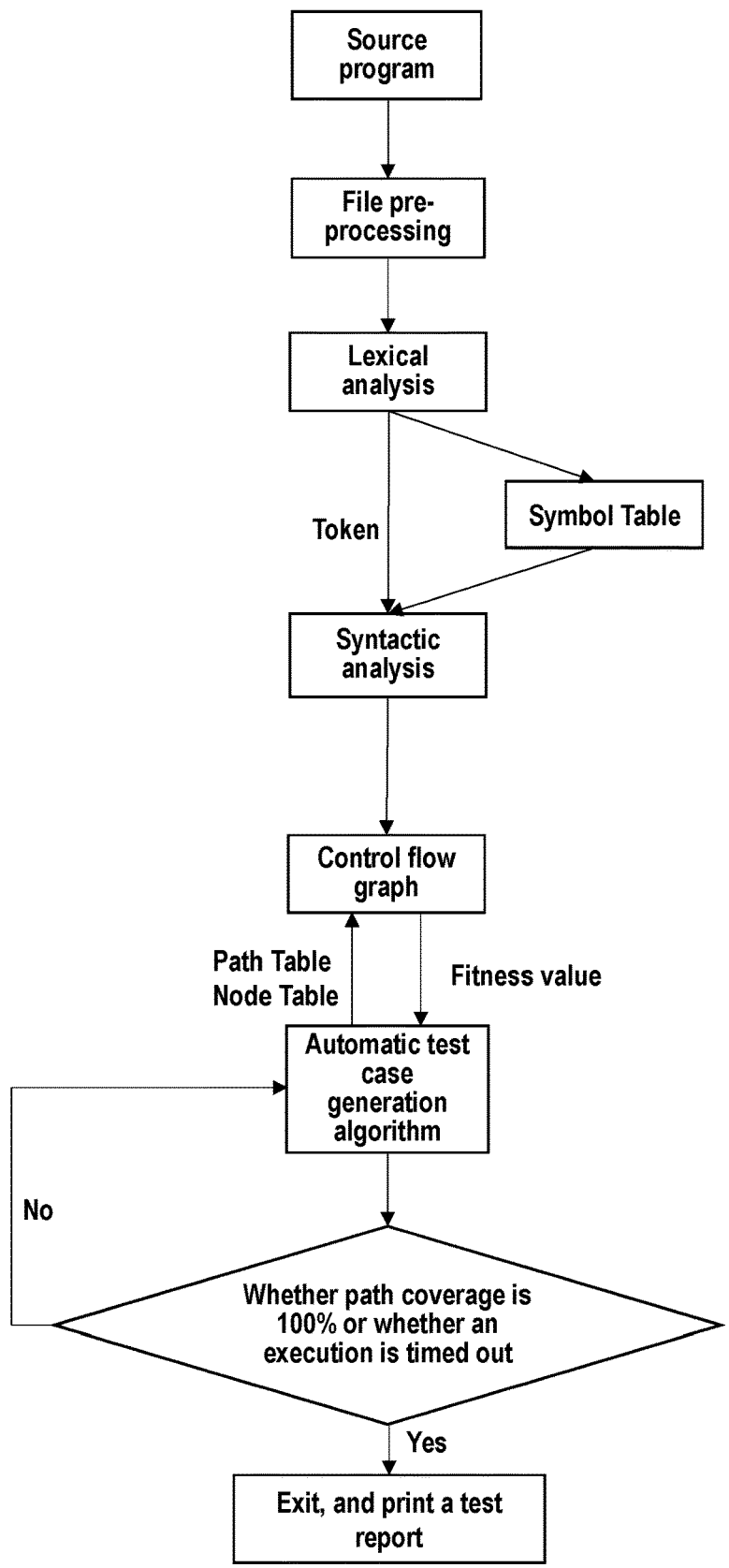
FIG. 1 is a flow of implementing a unit testing method based on automatic generation of path coverage test cases according to an embodiment.

As shown in FIG. 1, a unit testing method based on automatic generation of path coverage test cases comprises the following steps.

Figure 3:
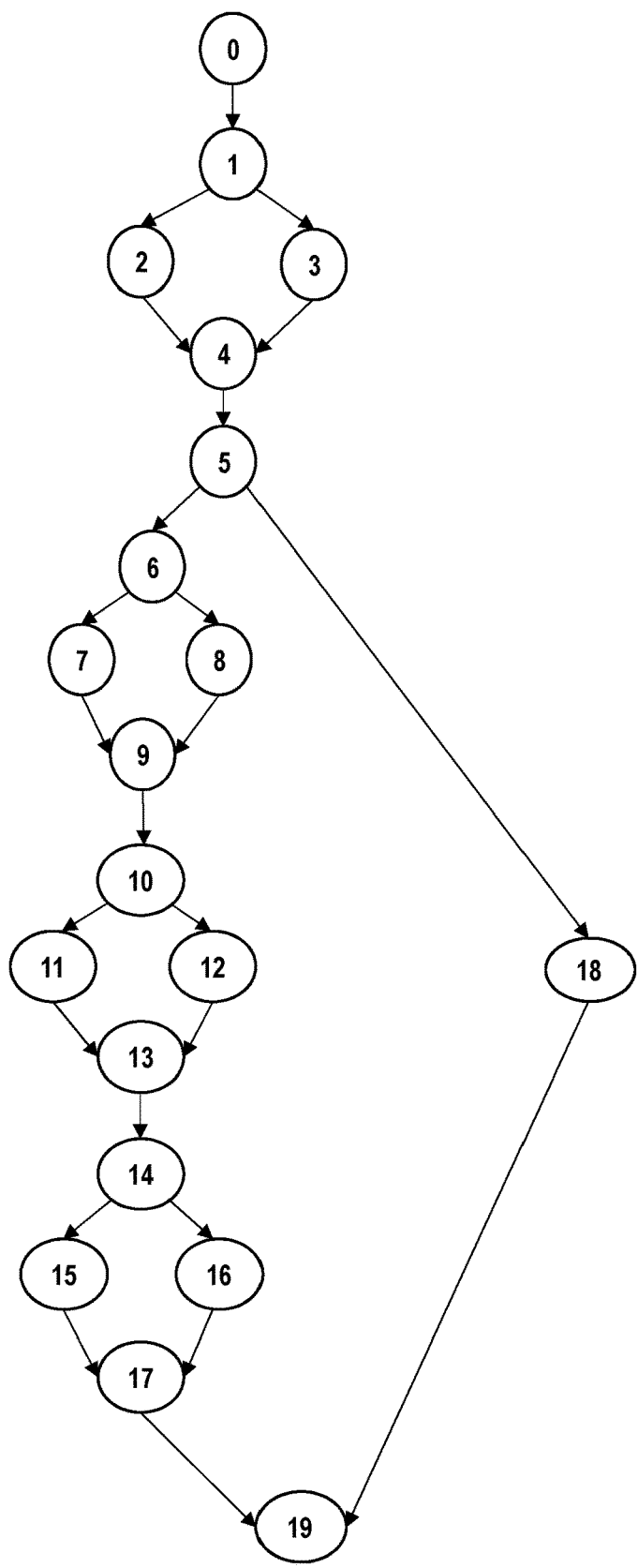
FIG. 3 is a control flow graph of the testing program "Triangle" according to the embodiment.

In a first step, a source program to be tested is inputted, a source program file is pre-processed, and a source code is parsed and compiled to generate a control flow graph (CFG). Each input, output, determination, and loop branch are analyzed, and a control flow graph (CFG) of a tested functional unit is drawn based on the information, as shown in FIG. 3. A path code table and a node code table are generated according to a determination node in the control flow graph, and a dimension of the test case is determined. After obtaining the control flow graph, the number of paths existing in the tested program is obtained according to a cyclomatic complexity of the control flow graph. We know that five branch determination nodes {1, 5, 6, 10, 14} exist in the tested program by analyzing FIG. 3, and we number the nodes from 1 to 5. It can be known from analysis of the source code that the source code has four paths, and the code of the four paths and a code execution result of a corresponding determination node (NAN is unknown) are shown in Table 1.

Table 1

TABLE 1

| Path code | Determine an execution result of an executable code in a node Determination node | | | | |
|---|---|---|---|---|---|
| | 1 | 5 | 6 | 10 | 14 |
| 1 | True | True | True | False | False |
| 2 | True | True | False | True | False |
| 3 | True | True | False | False | True |
| 4 | False | False | NAN | NAN | NAN |

A determination condition of the determination node 1 is to determine whether a triangle condition is met. The determination node 5 determines whether an isTriangle variable is true, the determination node 6 determines whether a triangle is an isosceles triangle, the determination node 10 determines whether the triangle is an equilateral triangle, and the determination node 14 determines whether the triangle is an ordinary triangle.

A path 1 indicates that an input test case meets an isosceles triangle condition, a path 2 indicates that the input test case meets an equilateral triangle condition, a path 3 indicates that the input test case meets an ordinary triangle condition, and a path 4 indicates that the input test case meets a non-triangle condition. In the path 4, since the input test case meets the non-triangle condition, when a drive program is executed to the determination node 5, a code execution result is false. A sub-node is searched to the right to continue executing, which means that a node 18 is selected, and then a node 19 is executed to reach a terminal node of a control flow graph, so that the program is ended. Therefore, executable codes in determination nodes 6, 10 and 14 are not executed, so that a result is NAN.

As shown in FIG. 3, we may clearly know that sequences of nodes corresponding to all paths of a Triangle problem in the control flow graph are shown in Table 2.

Table 2

TABLE 2

| Path code | Path composed of corresponding nodes in control flow graph |
|---|---|
| Path 1 | {0, 1, 2, 4, 5, 6, 7, 9, 10, 12, 13, 14, 16, 17, 19} |
| Path 2 | {0, 1, 2, 4, 5, 6, 8, 9, 10, 11, 13, 14, 16, 17, 19} |
| Path 3 | {0, 1, 2, 4, 5, 6, 8, 9, 10, 12, 13, 14, 15, 17, 19} |
| Path 4 | {0, 1, 3, 4, 5, 18, 19} |

In a second step, a specific problem code of the tested program is determined. Test cases based on path coverage are automatically generated according to an automatic test case generation algorithm (a method provided in the published Chinese patent application "a path coverage software test-based automatic test case generation method" with the application number of 2017107664223 may be used). According to the generated test cases, a test case execution module in software automatically searches the above generated control flow graph to generate paths, updates a path table and a node table, and returns to a fitness value generated corresponding to the test case for continuously generating the test cases by the algorithm. The path code and the fitness value corresponding to the test case may both be recorded at the same time for outputting the test report.

According to definitions of input variables a, b and c in the test problem "Triangle", a, b and c are all positive integers in a range of [1, MAX_VALUE], wherein MAX_VALUE represents a positive integer that may be expressed by a computer.

In a third step, we constantly generate the test cases and search generation paths in the control flow graph. If the four paths in the first step are completely covered or exceed a maximum number of iterations, generation of the test cases is stopped, and the program is existed. Meanwhile, the test report is outputted, which contains the paths covered by the test cases and the test cases.

It can be seen from the example results that effective path test cases of the Triangle problem may be found through the method of the present invention.

For other source programs to be tested, the source program code to be tested only needs to be inputted into the software, and then the test report may be outputted.

What is claimed is:

1. A unit testing method based on automatic generation of path coverage test cases, wherein the unit testing method comprises the following steps:
   (a) performing file pre-processing on an input source program, which is an input source code, to make the input source code conform to syntactic structures required by lexical analysis and syntactic analysis;
   (b) performing the lexical analysis on the input source code pre-processed in step (a), and establishing a symbol table;
   (c) performing the syntactic analysis on the input source code pre-processed in step (a), establishing a control flow graph (CFG) corresponding to the input source code, which comprises a control node, an ordinary node and a terminal node, converting the input source code into an executable intermediate code, and inserting an executable code into the control node;
   (d) generating test cases by an automatic test case generation algorithm;
   (e) acquiring the test cases and driving the executable code of the control node in the control flow graph to execute, by a test case execution module, and calculating a fitness value of a fitness function on a basis of an execution result of the executable code;

(f) if a current node is not the terminal node, selecting next sub-node according to the execution result of the executable code, and repeating steps (c), (d) and (e); otherwise, proceeding to next step;

(g) if the current node is the terminal node, acquiring a final result of the fitness value, and generating a path code corresponding to the test case;

(h) determining whether path coverage is 100% or whether an execution is timed out, proceeding to next step if the path coverage is 100%, and exiting if the execution is timed out; otherwise, if the path coverage is not 100%, and the execution is not timed out, repeating steps (d), (e), (f) and (g); and (i) generating a test report containing all paths covered by the test cases correspondingly and a path coverage rate, wherein in step (a), in case of multiple files in file pre-processing, the files are identified by an include statement in C/C++, and files needing the include statement are placed in a same source file; a block end identifier is inserted into an elseif statement and an else statement in an if-elseif-else structure, the if-elseif-else structure is converted into an if-else nested structure, and a case multi-branch structure in a switch statement structure is converted into an if-else multi-nested structure, thus reducing a code abstraction degree and a realization difficulty of the control flow graph, wherein in steps (b) and (c), an intermediate code representation method of the input source code is stored in the ordinary node and the control node, the execution of the program is able to be abstracted into modification of a variable value in a memory, a variable is represented as an ID symbol and pushed in the intermediate code representation method; meanwhile, an address of the variable in the symbol table is pushed, current processing being the variable is known through an ID identifier in a later intermediate code execution stage, then a position of the variable is able to be accessed through an address behind an ID, and the variable is operated; if the variable is a number, a NUM symbol is pushed; meanwhile, a value of the number is pushed, an operator is directly pushed, reduction of an abstraction degree of a high-level programming language is represented by the intermediate code, and then an intermediate code interpreter is established, thus directly executing the intermediate code; and a basic principle of the intermediate code interpreter is to use a mechanism of a stack computer to execute the intermediate code through one stack and multiple registers, and an execution result of the intermediate code is returned; and after converting the input source code into the intermediate code, an abstraction degree of the input source code is reduced, during actual execution of the intermediate code, a method of converting an infix expression into a suffix expression is used to calculate a result of the intermediate code through a data structure of the stack, wherein in step (c), execution of the input source program is simulated by executing the intermediate code.

2. The unit testing method based on the automatic generation of the path coverage test cases according to claim 1, wherein in steps (b) and (c), the lexical analysis and the syntactic analysis are performed on the input source code to generate the control flow graph (CFG) corresponding to the input source code, a structure of any executable code is able to be represented by a loop structure, a branch structure and a sequence structure, so that a sequential execution code is converted into a sequence node in the control flow graph, which contains an intermediate representation code of a sequential structure code in the input source code, wherein relevant code information is stored by a stack, and the branch structure and the loop structure are instantiated in the control flow graph by constructing a branch node and a local loop of the control flow graph.

3. The unit testing method based on the automatic generation of the path coverage test cases according to claim 1, wherein in step (c), a function-call-and-recursive function exist in the input source code, the function-call-and-recursive function is regarded as a module, the function-call-and-recursive function is analyzed to construct a control flow graph corresponding to the function-call-and-recursive function; when calling the function-call-and-recursive function, a pointer of a first node of the control flow graph corresponding to the function-call-and-recursive function is transmitted to a call function, and the control flow graph corresponding to the function-call-and-recursive function is constructed by combination; and a simple recursive function is constructed into a sub-graph of the control flow graph corresponding to the function-call-and-recursive function having a local loop, and the sub-graph is transmitted to an external caller to construct an overall control flow graph during recursive call.

4. The unit testing method based on the automatic generation of the path coverage test cases according to claim 1, wherein in step (c), a set of intermediate codes based on a stack computer is designed, the operator is converted into a corresponding operation instruction, operation instructions of PUSH, POP and MOV and identification instructions of ID, NUM and STR are added, which are used for converting the high-level programming language to generate the set of intermediate codes, and execution of the program is simulated by executing the set of intermediate codes.

5. The unit testing method based on the automatic generation of the path coverage test cases according to claim 1, wherein in steps (b) and (c), during the syntactic analysis, the syntactic analysis is performed on the input source code by recursive descent analysis method, thus assisting construction of the control flow graph, and the control flow graph which is generated by parsing the input source code is systematically constructed according to requirements of the automatic test case generation algorithm through steps (b) and (c), thus automatically generating the control flow graph.

6. The unit testing method based on the automatic generation of the path coverage test cases according to claim 1, wherein in steps (d) and (e), the control flow graph is drivable, which means that the control flow graph is able to automatically execute the executable code in the control node according to the generated test case, and then automatically select next node according to an execution result of the executable code, thus automatically generating a path in the control flow graph.

7. The unit testing method based on the automatic generation of the path coverage test cases according to claim 1, wherein in steps (d) and (e), during execution of the intermediate code in the control node in the control flow graph and during access of an intermediate code interpreter to the symbol table, when a current symbol is accessed, a record of the current symbol is exchanged with a record of a previous symbol in the symbol table, thus increasing a hit probability of a symbol in the symbol table and reducing a time spent in symbol hitting.

8. The unit testing method based on the automatic generation of the path coverage test cases according to claim 1, wherein in steps (d), (e), (f) and (g), the test cases are constantly and automatically generated through the automatic test case generation algorithm to drive generation of a path in the control flow graph, and if the path coverage rate does not reach 100% or the execution is not timed out, the automatic test case generation algorithm is improved according to an execution result of a previous test case to continue generating the test cases and continue generating the paths.

\* \* \* \* \*